United States Patent [19]

Stilley

[11] 3,918,950

[45] Nov. 11, 1975

[54] GLASS SHEET TEMPERING

[75] Inventor: George W. Stilley, Plantation, Fla.

[73] Assignee: PPG Industries, Inc., Pittsburgh, Pa.

[22] Filed: Dec. 3, 1974

[21] Appl. No.: 529,188

[52] U.S. Cl. .................................. 65/114; 65/351
[51] Int. Cl.² ......................................... C03B 27/00
[58] Field of Search ............ 65/114, 348, 349, 350, 65/351, 115

[56] References Cited

UNITED STATES PATENTS

| | | | |
|---|---|---|---|
| 1,960,222 | 5/1934 | Long | 65/114 |
| 2,078,541 | 4/1937 | Monnier | 65/115 |
| 2,137,061 | 11/1938 | Quentin | 65/114 |
| 2,160,065 | 5/1939 | Ford, Jr. | 65/349 |
| 2,876,592 | 3/1959 | Black et al. | 65/351 |

FOREIGN PATENTS OR APPLICATIONS

| | | | |
|---|---|---|---|
| 818,245 | 6/1937 | France | 65/348 |

Primary Examiner—Arthur D. Kellogg
Attorney, Agent, or Firm—Edward I. Mates

[57] ABSTRACT

Tempering glass sheets having relatively faint iridescent patterns by exposing the opposite surfaces of hot glass to arrays of blasts of tempering medium moving in overlapping circular orbits. The blast orbits applied against one surface are offset from those applied against the opposite surface by a small proportion of the diameter of the orbits traveled by each of the blasts. Corresponding blasts of opposing arrays so offset from one another move 180° out of phase with one another in said offset orbits.

The blasts are applied through nozzles arranged in a regular pattern relative to each respective glass surface to impart blasts that are relatively strong centrally and weaken progressively toward their peripheries. The adjacent orbits of movement of blasts against each glass surface are arranged relative to one another so that the rate of cooling of that surface varies from point to point as little as possible in a manner well known in the prior art. The present invention provides further improvements by arranging the blast orbits against the opposite surfaces relative to each other.

8 Claims, 4 Drawing Figures

GLASS SHEET TEMPERING

BACKGROUND OF THE INVENTION

1. Field of the Invention

This invention relates to tempering glass sheets, and applies to glass sheets supported in any position of orientation while chilling a glass sheet heated to a temperature sufficiently high to enable the rapid chilling to impart at least a partial temperature thereto. In particular, the present invention relates to a technique for reducing the obviousness of iridescent patterns generally observed in tempered glass sheets.

Tempered glass is characterized by a skin that is stressed in compression completely surrounding an interior core that is stressed in tension. In order to produce tempered glass, a glass sheet is first heated to a temperature well above the strain point and approaching its softening point. Such a temperature is preferably substantially uniform throughout the glass thickness in any given area when the glass sheet is to be tempered uniformly, although it may vary from area to area when differential tempering is desired. The elevated temperature required for tempering is higher than the temperature needed to deform the glass sheet.

After the glass sheet has obtained a sufficiently high temperature, it is suddenly chilled by quenching. This latter step is usually accomplished by applying cold air jets rapidly against the opposite surfaces of the heat softened sheet while providing relative movement between the sheet and the jets. One criterion for an effective tempering operation is to chill the glass so rapidly that its surface regions are cooled through the annealing range of the glass to below its strain point where the surface becomes set while the interior remains above the strain point and is still plastic.

It is well known that the portions of the glass sheet that cool through the annealing range before other portions develop a compression stress whereas the other portions develop a tension stress when the entire glass sheet cools to a uniform temperature below the strain point. Since glass is notoriously strong when stressed in compression and weak when stressed in tension, the glass skin stressed in compression provides a protective covering that causes the glass to be much more resistant to breakage than untempered glass. Another factor in rendering tempered glass safer than untempered glass is that tempered glass breaks up into very small fragments having smooth surfaces in the less frequent instances when it does fracture. The smoother particles of fractured tempered glass or "dice" are far less harmful to those in the vicinity of a tempered glass window than those in the vicinity of an untempered glass window when the window fractures. Untempered glass fractures more readily than tempered glass and, upon fracturing, produces pieces having jagged edges that are very dangerous.

It is well known that it is necessary to have each glass sheet increment subjected to the same amount of cooling as each other glass sheet increment in order to avoid iridescent marking on the glass, and continuous relative movement between the glass and the nozzles which apply cold blasts under pressure has been provided to this end. However, applying discrete blasts under pressure simultaneously against the opposite surfaces of the glass sheet tends to cause the glass sheet to develop an iridescent pattern, particularly when the opposite surfaces are swept by opposing blasts that sweep over aligned discrete areas. When the orbital paths of adjacent blasts overlap somewhat, the iridescent pattern becomes less definite, and, hence, less obvious to the human eye. However, a complete lack of iridescent pattern is virtually impossible to produce using nozzles moving in overlapping circular orbits that oppose one another to apply blasts that move in circular orbits against the opposite surfaces of the glass.

It has been suggested that the opposing sets of nozzles be moved simultaneously so that the individual nozzles of one set occupy positions in the aligned closed parallel orbits that are 180° out of phase with the corresponding nozzles of the other set. While this arrangement reduces the ease with which the iridescent pattern can be observed, the resulting iridescent pattern is merely softer but still observable by the naked eye.

It has also been suggested that the opposite surfaces of the glass be quenched by air blasts moving in overlapping orbital patterns so that triangles formed by points of impingement formed on one side of a glass sheet where adjacent orbits overlap to form points of strong impingement oppose the center of the triangles simultaneously formed at the opposite surface. Such an arrangement assumes that the individual blasts of air have uniform strength throughout their cross-section where they impinge on the glass surface and that the strong points of impingement formed at the points of overlap on one surface provides a strong cooling rate locally at one surface that compensates exactly for the relatively weak cooling rate at the point of the opposite surface aligned therewith. Such an assumption is not exactly correct and the need exists for an improvement in the iridescent pattern resulting from unequal simultaneous localized cooling of the opposite glass sheet surfaces.

2. Description of the Prior Art

U.S. Pat. No. 2,078,541 to Monnier discloses a technique for tempering glass sheets in which adjacent cooling jets move in closed circular orbits that intersect the orbits of adjacent jets at points on one surface of the sheet in which the rate of cooling is a maximum and that these points of intersection or maximum cooling form equilateral triangles, the points of the triangles providing points of maximum cooling and the centers of the triangles forming points of minimum cooling. This reference arranges the opposing sets of nozzles to be moved in paths so that the points of intersection of adjacent orbital movement of adjacent nozzles intersect on one side at points of the triangles which oppose the center of the triangles formed by the points against the opposite glass surface. In this manner, Monnier provides opposing patterns of cooling in which the coolest points provided on one surface of the glass sheet oppose the points of least cooling on the opposite surface of the sheet. However, unless the localized cooling at one surface compensates exactly for any lack of localized cooling at the aligned portion of the other surface, a condition almost impossible to obtain, each glass surface is provided with a regular pattern of hot and cold where one surface develops a uniform iridescent pattern and the opposite surface forms a uniform iridescent pattern whose regions of iridescence are intermediate the iridescent pattern on the first surface. The result is a composite pattern of iridescence throughout the entire area of the glass sheet that contains smaller areas of iridescence than when the opposing non-uniform cooling patterns are not misaligned.

Such patterns are more difficult to observe than patterns of iridescence formed by aligned moving air blasts, but still more improvement is needed.

U.S. Pat. No. 2,876,592 to Lloyd V. Black and James B. Moorehead discloses various criteria to follow to insure that glass sheets are cooled more uniformly by applying moving blasts of cooling fluid through nozzles that move in overlapping circular orbital paths. However, this patent provides movement of the nozzles in such a manner as to minimize the formation of non-uniform cooling patterns on each individual glass surface. When the orbital paths of the nozzles relative to one surface of a glass are aligned with the orbital paths of the nozzles relative to the opposite glass surface, the overlapping circular patterns of movement do provide some observable iridescence under certain circumstances, even when the opposing nozzles are 180° out of phase in their respective aligned orbits.

SUMMARY OF THE INVENTION

The present invention reduces the intensity of the iridescent patterns that are produced from tempering heat-softened glass sheets by rapid cooling by air blasts imparted through opposing arrays of nozzles moved in closed circular overlapping orbital paths. One of the sets of nozzles applying air blasts against one major glass surface is supported in offsetting relation to the other set of nozzles applying air blasts against the other major glass surface by a distance between corresponding nozzles of opposing sets that varies cyclically to break up the uniformity of pattern of difference of cooling between major surfaces.

In a specific embodiment of the invention for tempering glass sheets supported in a vertical plane, each nozzle is spaced from the glass sheet by a distance sufficient to cause the nozzle blast to widen en route to the point of impingement with the glass so that each air blast is relatively strong at its center and weakens progressively toward its periphery. Blasts from adjacent nozzles in one set move in overlapping relation to one another relative to one surface of the glass sheet so that the relatively strong central portions of adjacent blasts reinforce the relatively weak cooling effect of the peripheral portions of adjacent blasts. This movement system imparts a faint iridescent pattern on the one surface. The other set imparts a faint pattern on the other surface. Each nozzle facing one surface of the glass sheet occupies a position intermediate the position of the corresponding nozzle and nozzles adjacent said corresponding nozzle that face the opposite surface of the glass sheet. The drive moving the two sets of nozzles is such that the orbital position of the nozzles facing one surface of the glass sheet is offset 180 degrees from the simultaneous orbital position occupied by the corresponding offset nozzles in the other set. In this manner, the glass sheets are cooled by overlapping annular paths of air jets that overlap one another on one side of the glass and whose strong central portions of corresponding jets against the opposite surfaces of the glass sheet are always in spaced relation that gradually changes in a cyclical pattern. Thus, faint, offset iridescent patterns result in the tempered glass that are not as regular as those obtained in the prior art, and, hence, are more difficult to observe than the regular patterns of iridescence observed in glass sheets tempered according to the prior art.

The present invention will be better understood in the light of a description of a specific embodiment illustrating the present invention.

In the drawings wherein like reference numerals refer to like structural elements and which drawings form part of the description of the illustrative embodiment according to the present invention, FIG. 1 represents a plan view of a typical conveyor system used in apparatus for making tempered glass sheets, which apparatus is modified according to the present invention;

FIG. 2 is a fragmentary end view of a glass sheet cooling station forming part of said apparatus taken along the lines II—II of FIG. 1, omitting certain structural elements that would interfere with the clear view of the present invention;

FIG. 3 is a fragmentary vertical view of the glass sheet cooling station of FIG. 2 taken at right angles thereto along the lines III—III of FIG. 1, also omitting certain parts not essential for understanding the present invention; and FIG. 4 is a diagrammatic view showing how the circular orbits of the centers of corresponding air blasts against the opposite surfaces of a glass sheet overlap one another out of phase with one another and how the center to center distance varies cyclically during each orbital movement during the cooling phase of a glass sheet tempering operation to provide a pattern of cooling throughout the extent of the glass sheet that is less likely to be observed by the naked eye than cooling patterns of the prior art.

DESCRIPTION OF THE PREFERRED EMBODIMENT

Figure 1:
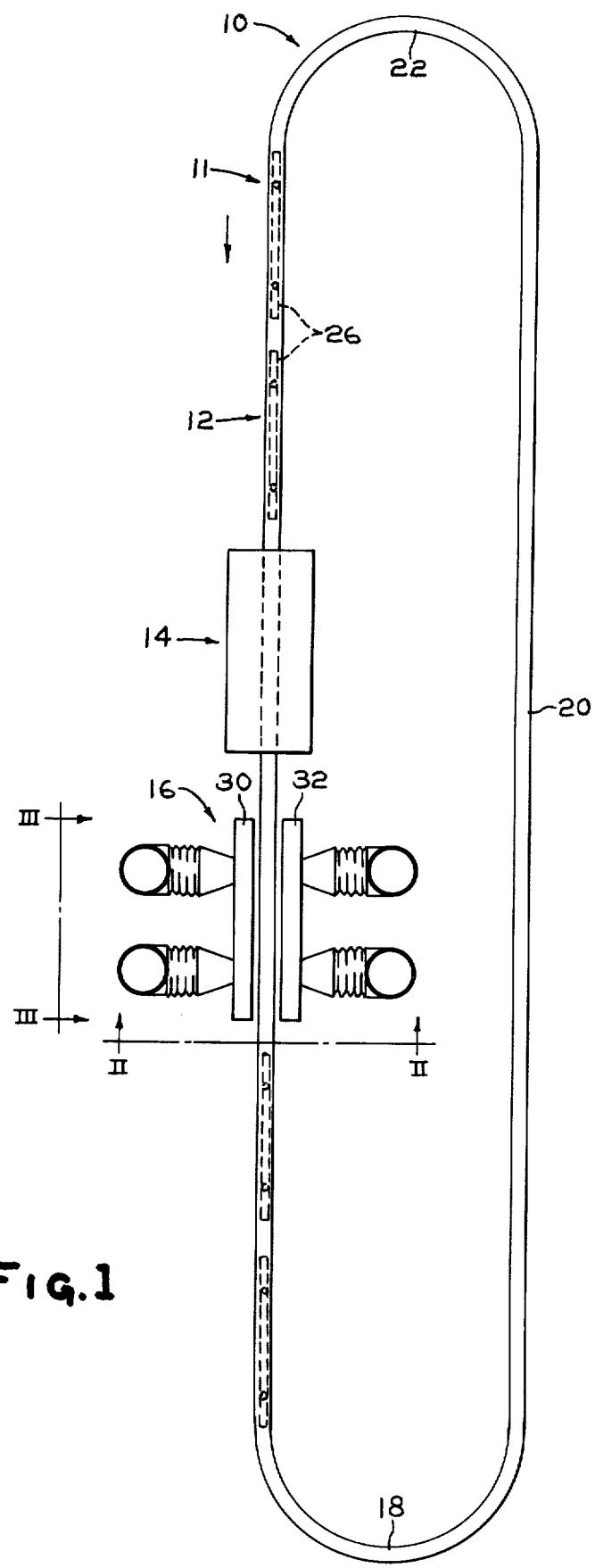

With reference to the drawings, FIG. 1 shows a typical apparatus for tempering enlarged flat glass sheets. The apparatus comprises an enclosed loop conveyor system 10 provided with an elliptical conveyor forming an endless track that comprises a forward run extending from a glass sheet loading and unloading station 11 through a glass sheet waiting station 12, a tunnel-type furnace 14, a cooling station 16, a first turn-around portion 18 beyond the exit of the cooling station 16, a return run 20 extending parallel to the forward run and a second turn-around portion 22 which connects the return run 20 to the sheet loading and unloading station 11.

The arrangement of the endless conveyor system relative to the loading and unloading station, the furnace and the cooling station is well known in the glass tempering art. The present invention relates to an improvement in the cooling station 16 and so only the cooling station 16, and particularly, the elements that provide the improvement in said method of cooling glass to reduce the ease of observing iridescent patterns in the glass will be described in detail.

Figure 2:
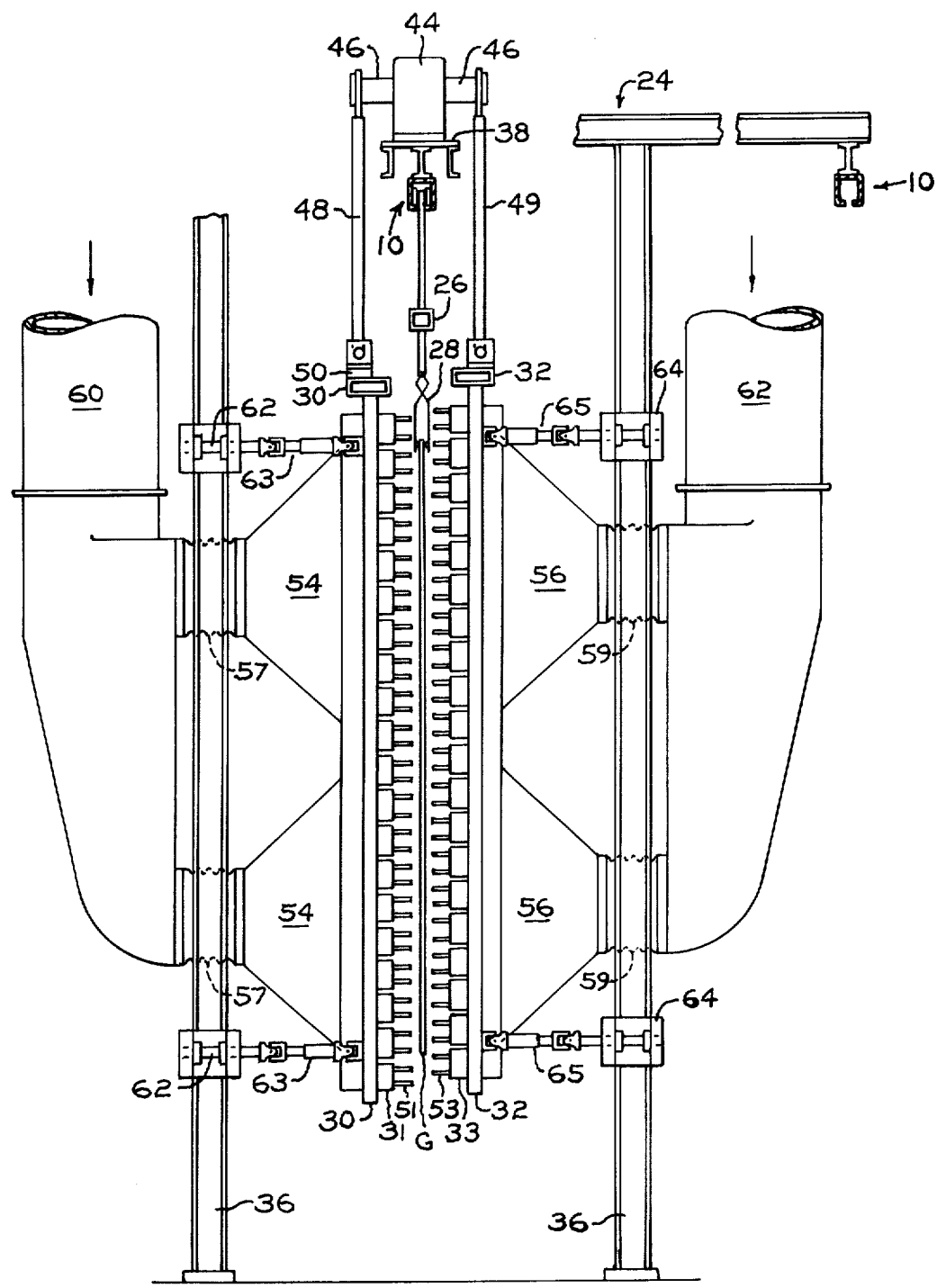

The conveyor system 10 is suspended from an overhead support structure 24 (FIG. 2). A plurality of carriages 26 are conveyed according to a desired time sequence around the enclosed path defined by the conveyor system 10.

At the sheet loading and unloading station 11, one or more glass sheets are loaded into tongs 28 carried by one of the carriages 26 after a previously treated one or more previously treated glass sheets has been removed. The manner of conveying the tong carrying carriages 26, whose tongs 28 engage the upper edges of glass sheets to be treated, is well known in the art and need not be repeated here. Suffice it to say that after the glass sheets are loaded onto the tongs 28 carried by the carriages 26 in the loading and unloading station 11, they are moved to the waiting station 12 until such time as the furnace 14 is empty to enable the glass sheet or sheets supported by said carriage 26 to be introduced into the furnace 14 to be heated to a temperature sufficient for tempering. The previous sheet is removed from the furnace 14 and moved to a position between a pair of skeleton frame structures 30 and 32 which support respective sets of nozzle boxes 31 and 33 that oppose one another and are moved in closed orbital paths in unison while air under pressure is applied against the opposite surfaces of the glass sheet or sheets occupying a position at the cooling station 16.

In accordance with the prior art, the plenum chambers were moved in unison in closed orbital circular paths to define overlapping orbits of movement for the air blasts from the nozzles extending from openings in the plenum boxes forming the forward part of the nozzle boxes facing one glass sheet surface such that the overlapping orbits of air blasts applied against one major surface of the glass were aligned with and exactly opposed by the closed circular orbits of the paths of movement of the air blasts from the corresponding nozzles of the opposite nozzle boxes. The prior art also provided that the circular orbits defining the paths of movement of corresponding nozzles from each of the opposing nozzle boxes were in opposite phase to one another so as to equalize the force applied to eccentrics used to drive the opposing nozzle boxes in circular movement to minimize wear on the moving elements particularly on the eccentric mechanisms.

According to the illustrative embodiment of the present invention, the nozzle openings have a diameter in the range of one-sixth to one-half of the orbital radius, usually approximately one-fourth thereof, and spaced opposing nozzle boxes are positioned in such a manner that any one nozzle extending from one of the nozzle boxes is offset in parallel planes from a corresponding nozzle extending from the other nozzle box a small proportion (under 25 percent) of the diameter of the closed orbital paths taken by each of the individual nozzles. The center to center nozzle to nozzle distance in each set differs from the orbital radius by less than the diameter of a nozzle opening. The circular patterns of the air blasts against each of the opposite surfaces of the glass sheet overlap one another to provide substantially uniform coverage of the sheet surfaces.

The pattern of air blasts applied against one of the opposite glass sheet surfaces is offset from the pattern of air blasts applied against the opposite glass sheet surface by distances that differ at different portions of the orbits. In addition, the positions of corresponding nozzles extending from opposing offset nozzle boxes are out of phase with one another continuously. Hence, the cooling patterns on the opposite glass sheet surfaces do not reinforce one another, but instead, are out of phase with one another. These opposing cooling patterns having the moving points of maximum cooling on one surface offset from the points of maximum cooling on the other surface at all times but at different distances of offsetting at different points in the orbits reduce the tendency to form a uniform iridescent pattern that would normally result and be reinforced when there is either no spacing or uniform spacing measured in the plane of the glass sheet between opposing air blasts against the opposing glass surfaces. Instead, a blended pattern that is less readily observable than a regular iridescent pattern results over the entire area of the glass sheet being cooled.

In the illustrative embodiment of the present invention, the tempering apparatus includes an open frame construction 34 comprising vertical beams 36 interconnected by a horizontal beam structure 38. The latter supports a drive motor 40 disposed centrally on a system of drive shafts 42. The latter are connected to speed reducers 44, each of which is connected through eccentric drives 46 to a pair of eccentrics 48 or 49.

Figure 3:
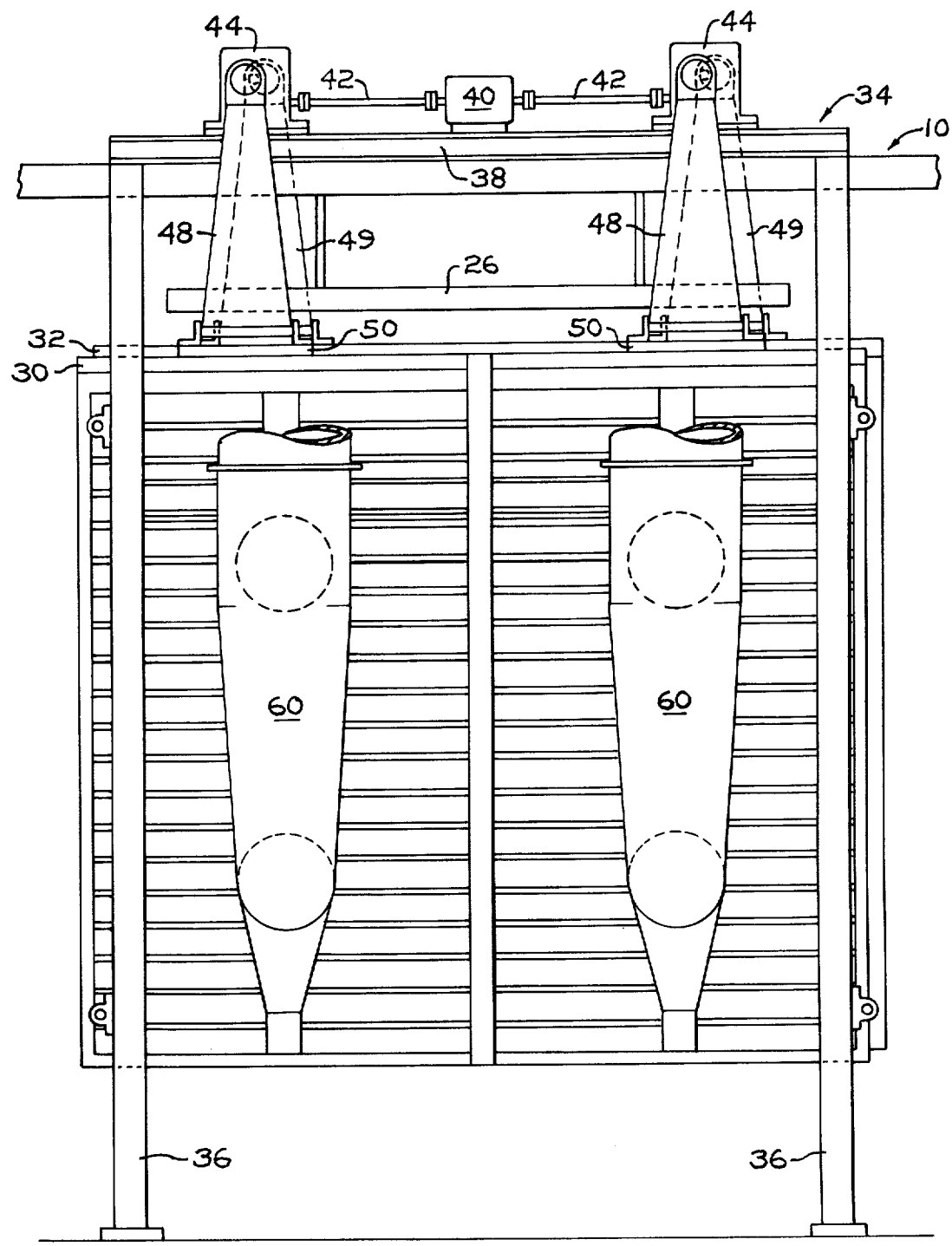

According to the present invention, one pair of eccentrics 49 is connected directly to the skelton skeleton structure 32 whereas the other pair of eccentrics 48 is connected to the skeleton frame structure 30 with spacer means in the form of spacer elements 50 disposed therebetween. (See FIG. 3).

The spacer element 50 has a thickness preferably approximately equal to one-sixth to one-half the radius of the displacement of the eccentrics 48. Since the frame structure 30 is identical to the frame structure 32 and the nozzle boxes 31 mirror images of nozzle boxes 33, the spacer element 50 causes the skeleton frame structure 30 and its nozzle boxes 31 to be disposed to move in a circular orbit vertically offset below the circular orbit in which skeleton structure 32 and its nozzle boxes 33 move.

Each nozzle box 31 and 33 extends horizontally and is built identical to every other nozzle box and is provided with two sets of horizontal rows of equally spaced nozzles. Nozzle boxes 31 have nozzles 51 extending in one direction and nozzle boxes 33 have nozzles 53 extending in the opposite direction from the direction of nozzles 51. The nozzle boxes communicate with respective air passages 54 and 56 which communicate through flexible connections 57 and 59 respectively, to air supply conduits 60 and 62. The latter supply air under pressure into the nozzle boxes 31 and 33 for dispensing air blasts through the nozzles 51 and 53 against the opposite surfaces of a glass sheet G (see FIG. 2) which is suspended between the opposing nozzle box frame structures 30 and 32 as the latter move simultaneously in offset orbits with corresponding nozzles 51 and 53 occupying simultaneous positions, A for nozzle 51 corresponding to position A' for nozzle 53, then position B of nozzle 51 corresponding to position B' for nozzle 53, then position C for nozzle 51 corresponding to position C' of nozzle 53 and then position D of nozzle 51 corresponding to position D' of nozzle 53, before the nozzles repeat the cycle of orbital movements.

Frame structure 30 is adjustably connected to a pair of vertical guide members 62 through connecting means 63 which fixes the adjustable horizontal position of frame structure 30. Likewise, frame structure 32 is similarly connected to vertical guide members 64 through connecting means 65 that fixes the adjustable horizontal position of frame structure 32. The horizontal positions of frame structures 30 and 32 is fixed so that the nozzle to glass distance is sufficient for the blasts to widen somewhat en route to the glass to provide a relatively strong central portion and a relatively weak peripheral portion. The vertical guide members 62 and 64 are fixed to the vertical beams 36. The connecting means 63 and 65 contain universal joints that allow nozzle boxes 64 to move in parallel planes. The eccentrics 48, 49 cause the nozzle boxes 31, 33 to move in circular orbital paths in these parallel planes.

The fact that the spacer 50 is provided between one pair of eccentrics 48 and frame structure 30 whereas the other pair of eccentrics 49 is connected directly to frame structure 32 provides a sufficient vertical offset so that when the nozzles are moved in parallel vertical planes in circular orbital paths that move over the vertically oriented sheet of glass being chilled, the pattern of overlapping closed paths of movement of air blasts against one major surface of the glass sheet is offset from the path applied to the opposite surface of the glass sheet by a cyclically varying distance in the plane of the glass sheet. This offsetting causes the patterns of cooling on the opposite surfaces of the glass to be offset relative to one another and prevents the glass from readily displaying a uniform iridescent pattern.

Figure 4:
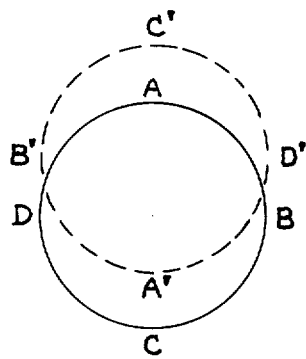

It is noted from FIG. 4 that the distance between the centers of corresponding opposing nozzles varies during the simultaneous impingement of air blasts against the opposite surfaces of the glass sheet. From a minimum distance A–A' slightly less than the orbital diameter A–C or A'–C' in the plane of the glass sheet, this distance increases cyclically through intermediate distance B–B' to a maximum distance C–C' slightly greater than said orbital diameter and then cyclically reduces through intermediate distance D–D' to the minimum distance A–A' at the start of the next cycle. It is believed that the combination of factors (nonuniform strength of air blasts, overlapping of relatively weak peripheral portions of air blasts against each glass sheet surface, offsetting the nozzle arrays against the opposite surfaces and cycling the distance of spacing between the centers of corresponding nozzles) in the plane of the glass sheet is the reason for the improvement seen in iridescent pattern experienced from using this invention.

SPECIFIC EMBODIMENT

In a specific embodiment of tempering apparatus presently used commercially, the nozzles of each set of nozzle boxes were arranged in a checkerboard pattern at 1.55 inch (39.37 millimeters) center to center spacing in both the vertical and horizontal directions. Each nozzle had an approximate inner diameter of five-sixteenths inch (7.9375 millimeters) at its open end and extended approximately 2.5 inches (63.5 millimeters) from an opening in the nozzle box approximately one-half inch (12.7 millimeters) in diameter. The nozzle openings of each set were capable of moving between a maximum recessed position in a vertical plane 9½ inches (241.3 millimeters) from the vertical plane occupied by the nozzle openings of the other set in symmetrical relation to the center line of the cooling station and a closed position also symmetrical to the center line where the nozzle openopenings of the opposing sets were spaced 3 inches (76.2 millimeters) from one another. The eccentrices provided a throw of 1.38 inches (34.3662 millimeters), thus inducing orbital paths having a similar radius. The nozzle boxes were arranged to extend horizontally with 40 nozzle boxes per set and two rows of 40 nozzles each extending horizontally from each nozzle box. The nozzle boxes were separated vertically from one another by three-fourth inch (19.05 millimeters) to provide horizontally extending spaces of that height for the escape of air blasts reflected off the major glass sheet surfaces. The apparatus was capable of handling glass sheets 9 feet (2743.2 millimeters) on each dimension.

A spacer element three-eighths inch (9.525 millimeters) thick was used to offset one set of nozzle boxes vertically with respect to the other set of nozzle boxes. The nozzles were moved at 60 cycles per second at 3.5 inch (8.89 millimeters) nozzle to nozzle spacing to obtain acceptable iridescent patterns in flat tempered glass sheets under the following conditions:

| GLASS THICKNESS | PLENUM PRESSURE |
| --- | --- |
| 3/16 inch (4.5 millimeters) | 350 – 380 millimeters water |
| ¼ inch (6 millimeters) | 150 – 170 millimeters water |
| ⅜ inch (9 millimeters) | 10 – 20 millimeters water |

The illustrative preferred embodiment just described represents one aspect of the present invention. It is also understood that it is within the contemplation of the present invention to incorporate its teaching for the tempering of glass sheets that are disposed horizontally or even obliquely as well as vertically. In such alternative embodiments, an upper set of nozzles is supported in spaced relation to a lower set of nozzles with the nozzle openings disposed in planes parallel to and on opposite sides of the plane of glass sheet support. Eccentric means disposed to one side of the apparatus instead of above the apparatus as in the first embodiment impart orbital movement to the spaced sets of nozzles at a phase difference of 180° from nozzle set to nozzle set in the spaced horizontal or oblique planes. As in the first embodiment illustrated and described previously, spacer means is provided between the eccentric drive means and one of the sets of nozzles only while the other set of nozzles is driven directly by the eccentric drive means with no spacer means therebetween to effect the offset relation of the nozzle sets to one another.

The glass sheets to be treated are supported on either outline supports or a series of spaced, finger-like support means that engage spaced portions about the periphery of the glass sheets. A conveyor extending along a path that intersects the cooling station between the nozzle sets moves the glass support means along said path in a plane other than vertical to transfer a hot glass sheet into position between the upper and lower sets of nozzles for application of moving blasts of tempering medium arranged to move in orbital paths in spaced planes parallel to the plane of glass sheet support similar to the orbital paths disposed in spaced vertical planes for the nozzles of the first embodiment. The conveyor means is constructed and arranged to remove the glass sheet after the latter has been cooled as in the first embodiment.

The form of this invention shown and described in this disclosure represents an illustrative preferred embodiment and alternatives thereof. It is understood that various changes may be made without departing from the gist of the invention as defined in the claimed subject matter that follows.

I claim:

1. In the method of tempering a glass sheet wherein said sheet is cooled from an elevated temperature sufficient for tempering by applying blasts of tempering fluid against the opposite surfaces of the sheet to cool the glass sheet at a rate sufficient to impart at least a partial temper to the glass and moving said blasts relative to said opposite surfaces in closed circular orbital paths whose peripheral portions overlap the peripheral portions of adjacent closed circular orbital paths, and applying the blasts from sets of uniformly spaced moving nozzles in such a manner that the central portion of each blast arriving at the glass sheet surface is relatively strong while its peripheral portion is relatively weak, the improvement comprising applying said blasts against the opposite glass sheet surfaces in such a manner that the center of the closed circular orbit of movement of each blast applied against one glass sheet surface is linearly offset from the center of the closed circular orbit of movement of the corresponding blast applied against the opposite glass sheet surface by a constant distance equal to a small proportion of the diameter of said orbits and the positions simultaneously occupied by corresponding blasts of opposite sets applying said blasts to the opposite surfaces of said glass sheet is 180° out of phase with one another to cause the distance between the centers of corresponding blasts from said sets against the opposite glass sheet surfaces measured along the plane of the glass sheet to vary cyclically during each orbit to produce a tempered glass sheet having an iridescent pattern that is difficult to detect with the naked eye.

2. In the method as in claim 1, wherein the glass sheet is supported in an upright position, the improvement in which the constant distance between the centers of said corresponding orbits is vertical.

3. In the method as in claim 1, wherein said blasts move across the surfaces of said glass sheet in orbits of equal diameter and the distance between the centers of corresponding blasts applied against the opposite glass sheet measured in the plane of the sheet varies cyclically from slightly greater than said orbital diameter to slightly less than said orbital diameter during the application of said blasts moving in said orbits.

4. Apparatus for tempering a glass sheet comprising means for supporting said sheet in a given position in a given plane, a first set of nozzles spaced to one side of said position with the openings for said nozzles arranged in a plane parallel to said given plane, means to apply blasts of tempering fluid through said first set of nozzles in one direction toward said position, a second set of nozzles spaced to the other side of said position with the openings for said second set of nozzles arranged in a plane parallel to said given plane, means to apply blasts of tempering fluid through said second set of nozzles in a direction opposite said one direction toward said position, means to move each nozzle of each set in a circular orbital path so that its nozzle opening moves in a plane for its set parallel to and spaced from said given plane, spacer means to support one set of nozzles in offset relation to said other set of nozzles, eccentric means to impart closed circular orbital movement to each of said sets of nozzles in such a manner that each nozzle of one of said sets simultaneously occupies a position 180° out of phase with the position occupied by a corresponding nozzle of the other of said sets during said closed circular orbital movement, and means for supporting a glass sheet in said given position between said sets of nozzles for application of said blasts from said sets of nozzles so arranged and so moved.

5. Apparatus as in claim 4, wherein said means for supporting said glass sheet is constructed and arranged to support said sheet in a vertical plane, a skeleton frame structure supports each set of nozzles for movement of said supported set of nozzles in circular orbits in planes parallel to said vertical plane with said nozzle openings facing said vertical plane and said spacer means to support one set of nozzles in offset relation to said other set of nozzles is disposed between only one of said eccentric means and only one of said skeleton structures, said spacer means being constructed and arranged to cause said skeleton structure supporting said first set of nozzles to move in an orbit whose center is below the center of the orbit of said skeleton structure supporting said other set of nozzles.

6. Apparatus as in claim 4, wherein said eccentric means is constructed and arranged to impart orbital movement of equal diameter to each nozzle of each set with each nozzle of one set 180° out of phase with the corresponding nozzle of the other set and said spacer means is constructed and arranged to offset the position of the skeleton structure supporting one of said sets of nozzles relative to that of the other skeleton structure a distance sufficient to offset the center of orbital movement of each nozzle of said first set relative to the center of orbital movement of the corresponding nozzle of said other set by a distance measured in the plane of said glass sheet equal to a small portion of the diameter of said orbits.

7. Apparatus as in claim 6, wherein said distance is between one-sixth and one-half of the radius of said orbits.

8. Apparatus as in claim 4, wherein each set of nozzles is arranged in a checkerboard pattern.

* * * * *